United States Patent [19]

Balmer

[11] Patent Number: 5,603,049
[45] Date of Patent: Feb. 11, 1997

[54] BUS SYSTEM SERVICING PLURAL MODULE REQUESTORS WITH MODULE ACCESS IDENTIFICATION KNOWN TO SYSTEM USER

[75] Inventor: Keith Balmer, Bedfordshire, England

[73] Assignee: Texas Instruments Incorporated, Dallas, Tex.

[21] Appl. No.: 590,378

[22] Filed: Jan. 25, 1996

Related U.S. Application Data

[62] Division of Ser. No. 626,245, Dec. 12, 1990, Pat. No. 5,504,911, which is a continuation of Ser. No. 294,075, Jan. 5, 1981, abandoned.

[30] Foreign Application Priority Data

Jan. 5, 1988 [GB] United Kingdom .................. 8800097

[51] Int. Cl.$^6$ ........................................... G06F 13/36
[52] U.S. Cl. .................. 395/800; 364/240.1; 364/242.6; 364/240.5; 364/264; 364/DIG. 1
[58] Field of Search ................................. 395/800, 287, 395/309, 485, 835

[56] References Cited

U.S. PATENT DOCUMENTS

| | | | |
|---|---|---|---|
| 4,453,211 | 6/1984 | Askinazi | 395/500 |
| 4,541,043 | 9/1985 | Ballegeer | 395/650 |
| 4,665,483 | 5/1987 | Ciacci | 395/294 |
| 4,672,537 | 6/1987 | Katzman | 395/185.09 |
| 4,774,659 | 9/1988 | Smith | 395/418 |
| 4,959,772 | 9/1990 | Smith | 395/185.01 |
| 5,384,906 | 1/1995 | Horst | 395/550 |
| 5,506,972 | 4/1996 | Heath | 395/293 |

*Primary Examiner*—Eric Coleman
*Attorney, Agent, or Firm*—William E. Hiller; Richard L. Donaldson

[57] ABSTRACT

An integrated circuit having a plurality of modules and an internal communication bus interconnecting the modules is arranged to produce an output indicating which module is granted access to the bus at the time. A control means grants to a module access to the bus in response to a request from the module on the basis of the priority of its request amongst any other requests for access. The control means produces the output indication in digital form which is multiplexed with other data from the bus at an output port of the integrated circuit.

19 Claims, 2 Drawing Sheets

ONE MEMORY CYCLE

4 BITS OF ADDRESS / 4 BIT MODULE CODE / 4 BITS OF DATA / 4 BITS OF DATA

| MODULE CODE | BUS OWNER |
|---|---|
| 0 0 0 0 | MODULE 1 |
| 0 0 0 1 | -CODE UNUSED- |
| 0 0 1 0 | MODULE 2 |
| 0 0 1 1 | MODULE 3 |
| 0 1 0 0 | -CODE UNUSED- |
| 0 1 0 1 | -CODE UNUSED- |
| 0 1 1 0 | MODULE 4 |
| 0 1 1 1 | -CODE UNUSED- |
| 1 0 0 0 | MODULE 5 |
| 1 0 0 1 | MODULE 6 |
| 1 0 1 0 | MODULE 7 |
| 1 0 1 1 | MODULE 8 |
| 1 1 0 0 | -CODE UNUSED- |
| 1 1 0 1 | -CODE UNUSED- |
| 1 1 1 0 | -CODE UNUSED- |
| 1 1 1 1 | -CODE UNUSED- |

BUS SYSTEM SERVICING PLURAL MODULE REQUESTORS WITH MODULE ACCESS IDENTIFICATION KNOWN TO SYSTEM USER

This is a division of application Ser. No. 07/626,245, filed Dec. 12, 1990, now U.S. Pat. No. 5,504,911 as a continuation of application Ser. No. 07/294,075, filed Jan. 5, 1989, now abandoned.

This invention relates to an integrated circuit and in particular to such a circuit as includes at least one internal bus for conveying signals between parts of the circuit or between a part of the circuit and input or output terminals.

As integrated circuits become more complex many of them contain modules connected to a common internal communication bus. In the operation of the circuit each module makes a request for access to the bus to a controller when it wants it and the controller allocates the use of the bus to the module having the highest priority. This method of operation is satisfactory in practice, but it suffers from the disadvantage that a user observing the operation of the circuit by monitoring the signals on its contact pins does not know which module is using the bus at the time. For example, if the bus is brought out at contact pins of the circuit and through them is connected to access external memory, it will not be clear which module is making a memory access, as a memory access appears the same regardless of the module making it. This information would clearly be useful in debugging software or otherwise looking for the cause of a failure of a system to work correctly.

It is an object of the present invention to provide a solution to this problem.

According to the present invention there is provided an integrated circuit including a plurality of circuit modules, an internal communication bus common to the circuit modules, and the access control means responsive to requests from the circuit for selectively granting to the modules making the requests to modules for access to the bus one at a time, wherein the circuit includes means for producing an output indication as to which circuit module is granted access to the bus at the time.

The control means may be arranged to produce the output indicating to which module it has granted access to the bus.

The output indication may be in digital form and multiplexed with the other data on the bus.

One example of an integrated circuit according to the invention includes eight circuit modules each connected to a 16-line parallel data bus and a 20-line parallel address bus. A multiplexer in the circuit is connected to four conductors from each of the data and address buses and multiplexes the signals on them on to a 4-line parallel output bus together with a 4-bit parallel output from the control means indicating which of the eight modules is granted access to the bus by it. As there are only eight circuit modules and there are sixteen possible 4-bit groups it follows that some of the possible 4-bit groups are not required and may be used for other purposes.

In order that the invention may be fully understood and readily carried into effect an example of the invention will now be described with reference to the accompanying drawings, of which:

Figure 1:
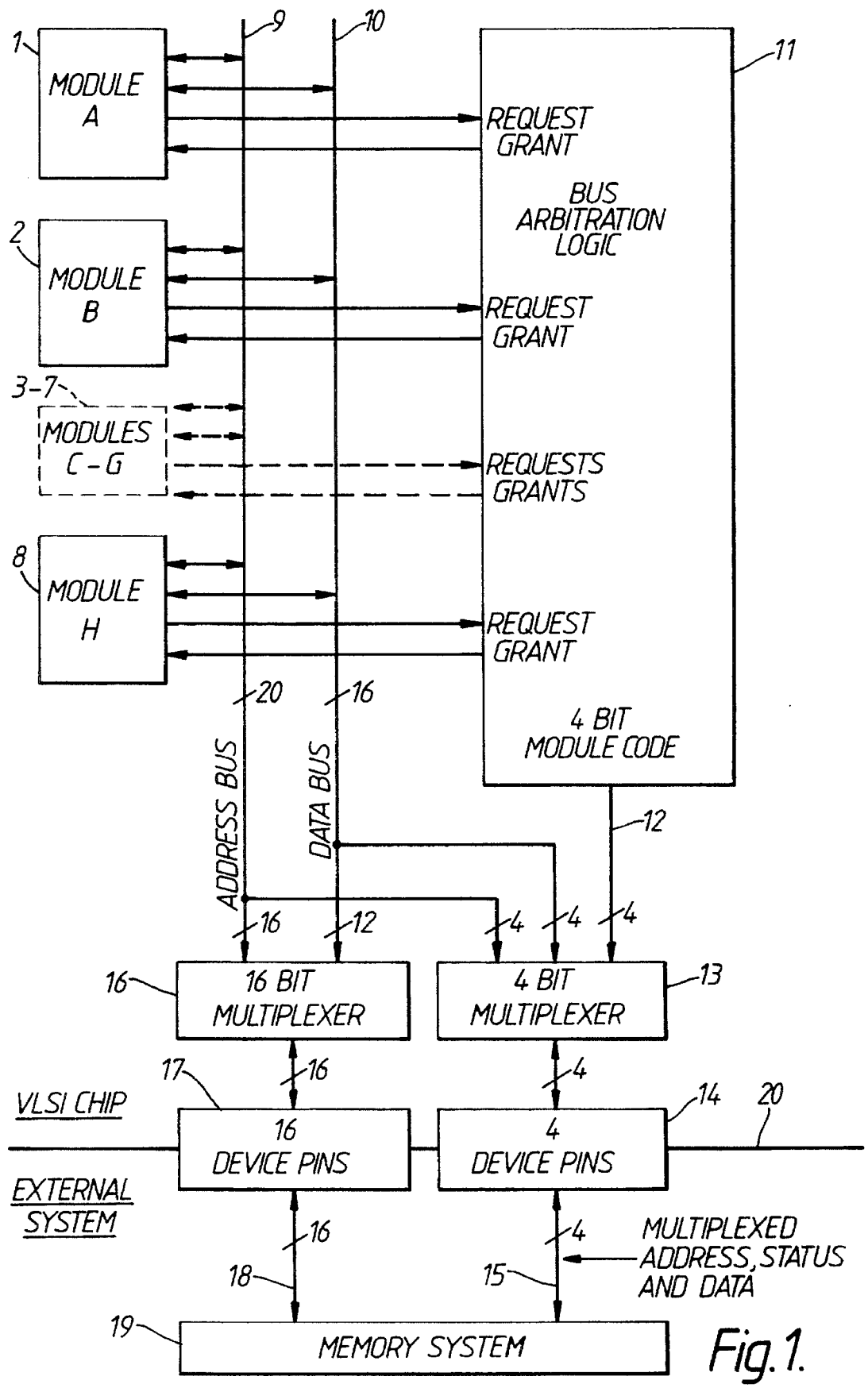
FIG. 1 is a block diagram of an integrated circuit according to the example of the invention.
Figures 2, 3:
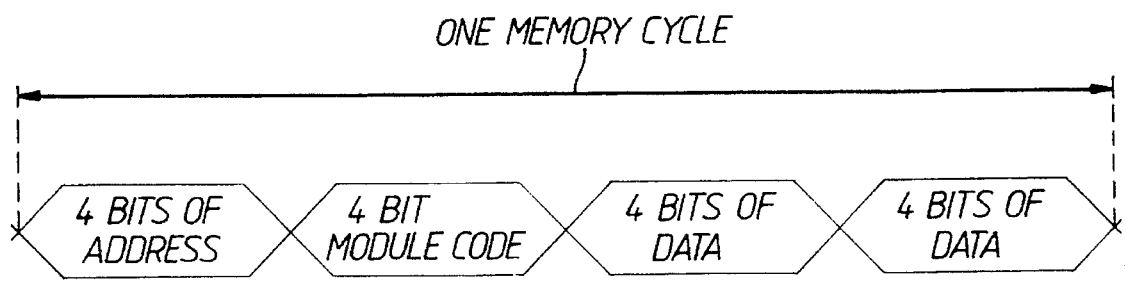
FIG. 2 shows the timing of a 4-bit output indication of which module has been granted access to the buses when multiplexed with 4-bit groups from the address and data buses of the example of the invention.
FIG. 3 is a table showing the 4-bit groups allocated to the different modules in the example of FIG. 1.

The integrated circuit shown in FIG. 1 has eight modules 1, 2, ..., 8, each connected to an address bus 9 and a data bus 10. The address bus 9 has twenty conductors and the data bus 10 has sixteen conductors. A bus arbitration logic circuit 11 is connected to each module 1, 2, ..., 8 to receive from it a request for access to the buses 9 and 10 and to send to it either a signal indicating that it has been granted access to the buses or a signal indicating that it has been refused access to them. The circuit 11 has a four conductor output bus 12 to which it applies a 4-bit binary code representing which of the modules 1, 2, ..., 8 has been granted access to the buses 9 and 10 at the time.

A 4-bit multiplexer 13 has three sets of four conductor inputs/outputs, the bus 12, four conductors of the address bus 9 and four conductors of the data bus 10. The multiplexer 13 has a 4-bit output/input which is applied to the four pins 14 of the integrated circuit.

The sixteen conductors of the address bus 9 and the twelve conductors of the data bus 10 which are not connected to the multiplexer 13 are connected as two separate groups of inputs/outputs of a 16-bit multiplexer 16. The multiplexer 16 has a 16-bit output/input which is applied to sixteen pins 17 of the integrated circuit. Both multiplexers 13 and 16 are bidirectional and can convey both input and output signals between the pins 14 and 17 and the buses 9, 10 and 12.

Clock means not shown in FIG. 1 is used to operate the multiplexers 13 and 16 so that the outgoing signals are in the required format and the incoming signals are directed correctly to the buses.

As shown in FIG. 1, the four pins 14 and the sixteen pins 17 are connected through four conductors 15 and sixteen conductors 18 respectively to a memory system 19. A line 20 indicates the boundary between the integrated circuit and the external circuitry.

The modules 1, 2, ..., 8 may be signal processing devices, for example, which, after completing the operations of a process on some signal values derived from the memory system 19, seek to store the results in the memory system and derive some further signal values from it for processing. Therefore, when a module is ready to transfer values, to or derive signals from, the memory system 19 it makes a request to the bus arbitration system logic circuit 11 for access to the buses. The circuit 11 allocates a priority to the request which may depend on which module the request is received from, on the stage of signal processing that has been reached and on the period of time for which the module has been waiting for access, for example, and sends a signal to the module indicating either that access has been granted or that it has been refused. If access is refused the module may be switched to an idle state to await the granting of access. When access is granted the module feeds its address and data information on to the buses 9 and 10 which convey the information to the other modules (for internal data transfer) and to the memory system 19. All modules may be arranged to receive signals from the buses 9 and 10 when not feeding signals to them, and to this end the modules may be allocated addresses so that they can identify and record data transmitted to them via the buses.

In the example being described the memory system 19 is a dynamic random access memory and is arranged to select the required location in the memory on receiving address information via the conductors 15 and 18. Shortly after receiving the address information the memory 19 reads the data stored in the selected location and emits corresponding data signals on the conductors 15 and 18. If the data stored at the selected address is not to be changed the data signals are used by means internal to the memory 19 to refresh the stored data in the usual manner for dynamic memory. On the other hand, if the data stored at the selected address is to be changed, for example by substituting data from one of the modules 1, 2, . . . , 8, then the data signals from the particular module appear on the conductors 15 and 18 immediately after those output by the memory 19, and the memory 19 writes the data represented by the other data signals into the selected location in place of those previously stored there.

There is a time interval between the address information's being applied to the memory 19 and its producing data signals, and during this time interval the 4-bit module code from the bus arbitration logic circuit 11 is transmitted by the multiplexer 13 to the conductors 15. The memory 19 makes no use of the 4-bit module code, but a monitoring circuit (not shown) may be connected to the conductors 15 to select and store the module code so that it is accessible to a user for debugging or other purposes.

I claim:

1. A circuit comprising:

a plurality of circuit modules;

an internal communication bus connected to said circuit modules;

said circuit modules including circuitry for generating requests for access to said communication bus and respective circuitry for receiving permission to access said communication bus;

an access controller responsive to bus access requests from said circuit modules for selectively generating an enabling signal which is directed to one of said receiving circuitry of one of said modules at a time to grant access to the receiving circuit module;

identifying circuitry for producing a plurality of different output indication signals respectively representing each one of said plurality of circuit modules, said identifying circuitry being conditioned upon the selective granting of access to a specific receiving circuit module by said access controller for producing a particular one of said plurality of different output indication signals and identifying which one of said circuit modules currently has access to said communication bus; and said identifying circuitry including conductors on which the plurality of different output indication signals selectively occur as a signal state in producing the particular one of said plurality of different output indication signals;

the signal state of said conductors of said identifying circuitry being accessible to a user for recognition by the user of the signal state of said conductors, thereby identifying to the user which one of said circuit modules currently has access to said communication bus.

2. A circuit according to claim 1, including a plurality of connection means respectively connecting said access controller and said circuit modules; said connection means providing paths for transmission to said access controller of requests for access to said communication bus from said circuit modules, and paths for transmission from said access controller to said circuit modules of signals granting or not granting access to said communication bus.

3. A circuit according to claim 1, wherein said plurality of different output indication signals are respective digital signals.

4. A circuit according to claim 3, wherein said identifying circuitry produces a parallel, multi-bit binary number signal representative of a particular one of said plurality of circuit modules.

5. A circuit according to claim 4, wherein said binary number signal is a four bit signal.

6. A circuit according to claim 3, wherein said identifying circuitry can produce a number of different output indication signals greater than the number of said circuit modules, selected ones of said different output indication signals respectively allocated to identification of said circuit module access to said communication bus and others of said different output indication signals being available for other purposes.

7. A circuit according to claim 3, including means for multiplexing said digital signal output indication with other data to an output port of said circuit.

8. A circuit according to claim 1, wherein said identifying circuitry produces a digital output indication signal representative of the particular one of said plurality of circuit modules currently having access to said communication bus, and means is provided for outputting said digital output indication signal serially or in parallel from at least one dedicated terminal of said circuit.

9. A circuit according to claim 1, including means for providing an interrogation signal for operating said identifying circuitry.

10. A circuit according to claim 1 and further comprising circuitry connected to said conductors of said identification circuitry on which the plurality of different output indication signals selectively occur for storing the said output indication signal representative of the particular one of said plurality of circuit modules currently having access to said communication bus.

11. A circuit comprising:

an internal communication bus;

a plurality of circuit modules connected to said communication bus, said circuit modules including circuitry for generating requests for access to said communication bus and circuitry for receiving permission to access said communication bus;

access control circuitry responsive to bus access requests from said circuit modules for selectively granting access to one of said modules at a time;

circuitry conditioned upon the selective granting of access to the communication bus by said access control circuitry to a particular one of said plurality of circuit modules for producing a specific output indication signal from a plurality of different output indication signals respectively representing each one of said plurality of circuit modules for identifying which one of said circuit modules currently has access to said communication bus;

said identifying circuitry including conductors on which the plurality of different output indication signals selectively occur as a signal state in producing the specific output indication signal of said plurality of different output indication signals respectively representing each one of said plurality of circuit modules for identifying which one of said circuit modules currently has access to said communication bus;

the signal state of said conductors of said identifying circuitry being accessible to a user for recognition by the user of the signal state of said conductors, thereby identifying to the user which one of said circuit modules currently has access to said communication bus; and monitoring circuitry coupled to said conductors of said identifying circuitry on which the plurality of different output indication signals selectively occur as a signal state in producing a particular one of said plurality of different output indication signals for storing the output indication signal for later retrieval by the user.

12. A circuit according to claim 11, including connection circuitry connecting said access control circuitry and said circuit modules, said connection circuitry providing paths for transmission to said access control circuitry of requests for access to said communication bus from said circuit modules, and paths for transmission from said access control circuitry to said circuit modules of signals granting or not granting access to said communication bus.

13. A circuit according to claim 12, wherein said output indication circuitry can produce a number of different output indication signals greater than the number of said circuit modules, selected ones of said different output indication signals respectively allocated to identification of said circuit module access to said communication bus and others of said different output indication signals being available for other purposes.

14. A circuit according to claim 11, wherein said plurality of different output indication signals are respective digital signals.

15. A circuit according to claim 14, including circuitry for multiplexing said digital signal output indication with other data to an output port of said circuit.

16. A circuit according to claim 15, wherein said identifying circuitry for producing said output indication signal produces a digital output indication signal, and circuitry is provided for outputting said digital output indication signal serially or in parallel from at least one dedicated terminal of said circuit.

17. A method of communicating between a plurality of circuit modules and a communication bus, comprising the steps of:

generating requests from the modules to access control circuitry;

determining priority between modules requesting access;

generating a signal directly and only to a selected one of said modules indicating that access is granted to the exclusion of the other modules; and outputting a signal only indicative of the selected module in a form accessible to a user for recognition by the user as to which one of the circuit modules currently has access to control circuitry via the communication bus.

18. The method of claim 17 and further comprising the step of storing said signal only indicative of the selected module in a monitoring circuit for later retrieval by the user.

19. The method of claim 17 and further comprising the step of coupling the communication bus to a memory circuit.

* * * * *